(12) United States Patent
Wyse et al.

(10) Patent No.: US 7,188,523 B2
(45) Date of Patent: Mar. 13, 2007

(54) VIBRATING MASS GYROSCOPE AND METHOD FOR MINIMIZING BIAS ERRORS THEREIN

(75) Inventors: Stanley F. Wyse, Encino, CA (US); David D. Lynch, Santa Barbara, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 11/364,318

(22) Filed: Feb. 28, 2006

(65) Prior Publication Data

US 2007/0028686 A1    Feb. 8, 2007

Related U.S. Application Data

(60) Provisional application No. 60/706,665, filed on Aug. 8, 2005.

(51) Int. Cl.
*G01C 19/00* (2006.01)
*G01P 21/00* (2006.01)

(52) U.S. Cl. ..................... 73/504.12; 73/1.38
(58) Field of Classification Search ............. 73/504.02, 73/504.04, 504.12, 504.13, 504.14, 504.15, 73/504.16, 1.27, 1.38
See application file for complete search history.

(56) References Cited

U.S. PATENT DOCUMENTS 5,434,467 A * 7/1995 Abe et al. .................. 310/366
5,932,802 A * 8/1999 Ogawa ..................... 73/504.02
6,588,274 B1 * 7/2003 Kumada et al. ......... 73/504.02
6,792,792 B2 * 9/2004 Babala ....................... 73/1.38
6,805,007 B2 * 10/2004 Fell et al. ................ 73/504.12

* cited by examiner

*Primary Examiner*—Helen Kwok
(74) *Attorney, Agent, or Firm*—Carmen B. Patti & Assoc., LLC

(57) ABSTRACT

An exemplary vibrating mass gyroscope uses a mass disposed for movement along an x-axis and y-axis. First and second electrodes are disposed adjacent surfaces of the mass along an x-axis and y-axis. Circuitry, coupled to the first and second electrodes, provides during a first mode a dither driving voltage on one of the first and second electrodes causing vibrating displacement of the mass along the one of the x-axis and y-axis. The measurement voltage is sensed on the other of the first and second electrodes where the measurement voltage represents a first angular rate value. During a second mode, the circuitry provides a dither driving voltage on the other of the first and second electrodes causing vibrating displacement of the mass along the other of the x-axis and y-axis and measurement voltage is sensed on the one of the first and second electrodes where the measurement voltage represents a second angular rate value. A combiner coupled to the circuitry receives the first and second angular rate values, and generates a resulting angular rate value based on both the first and second angular rate values wherein common bias errors are canceled. The common bias errors cancel because the pickoff sensing axis is coincident with the forcing axis when the same electrode is used for both the forcing and for the pickoff.

12 Claims, 2 Drawing Sheets

VIBRATING MASS GYROSCOPE AND METHOD FOR MINIMIZING BIAS ERRORS THEREIN

CROSS REFERENCE TO RELATED APPLICATION

This application claims the benefit of priority on U.S. Provisional Application Ser. No. 60/706,665 filed Aug. 8, 2005, and entitled "Apparatus and Method for Aligning Capacitively Based Input Signals and Forcers in a Vibrating Gyroscope".

BACKGROUND

This invention relates to vibrating mass gyroscopes and to how force-applying signals and sensed output signals are implemented.

An axisymmetric vibrating gyroscope can be considered to be a classic two dimensional oscillator. A pictorial representation of a dynamic model of such a gyroscope is shown in FIG. 1. In operation the mass M is dithered along one axis, e.g. the x-axis, wherein the mass M is driven so that it vibrates along the x-axis. The output of the other axis, the y-axis in this example, senses the Coriolis forces generated by the angular rate $\Omega$. The Coriolis forces act in a direction at right angles to the direction of vibration and to the axis of the rotation. The amplitude of any vibration along the sense axis is driven to zero by a feedback loop, e.g. a servo loop. The modes are then reversed, i.e. the x-axis becomes the sensing axis and the y-axis becomes the axis along which the mass is driven, in an attempt to cancel common error terms. As will be explained in greater detail below, bias error cancelation may require more than just mode reversal only. Therefore, a need exists to minimize bias errors in a vibrating mass gyroscope using techniques such as described below.

SUMMARY

It is an object of the present invention to satisfy this need.

An exemplary vibrating mass gyroscope uses a mass disposed for movement along an x-axis and y-axis. First and second electrodes are disposed adjacent surfaces of the mass along an x-axis and y-axis. Circuitry, coupled to the first and second electrodes, provides during a first mode a dither driving voltage on one of the first or second electrodes causing vibrating displacement of the mass along the one of the x-axis or y-axis. The measurement voltage is sensed on the other of the first or second electrodes where the measurement voltage represents a first angular rate value. During a second mode, the circuitry provides a dither driving voltage on the other of the first or second electrodes causing vibrating displacement of the mass along the other of the x-axis or y-axis and measurement voltage is sensed on the one of the first or second electrodes where the measurement voltage represents a second angular rate value. The two angular rate values are stored in memory and added to one another after the measurements are made. The true angular rate is determined by this sum since the biases reverse between the two modes but the angular rates do not. The cancelation occurs when the sensing axis for a given axis is aligned to its driving axis. This alignment is achieved when the same electrode is used for both the dither driving and for sensing.

A method is provided that performs the functions as generally described above.

DESCRIPTION OF THE DRAWINGS

Features of exemplary implementations of the invention will become apparent from the description, the claims, and the accompanying drawings in which:

DETAILED DESCRIPTION

Figure 1:
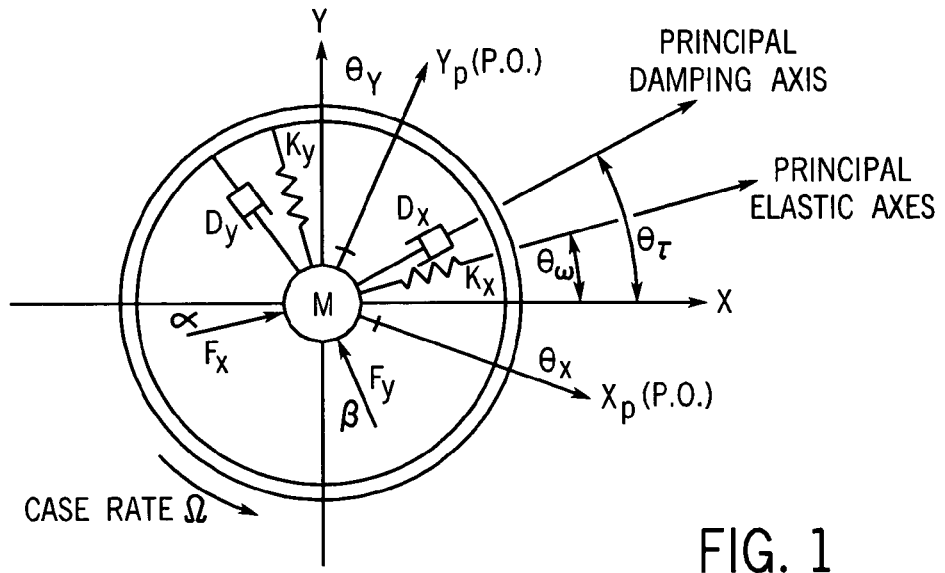
FIG. 1 is a pictorial representation of a prior art gyroscope of the axisymmetric two-dimensional vibrating mass type.

One aspect of the present invention resides in the recognition of a cause for the lack of cancellation of bias errors in a vibrating mass gyroscope even with mode reversal, and a solution for this. For example in FIG. 1 the misalignment angle $\alpha$ for forcer $F_X$ must be coincident with the x-pickoff axis $X_P$, i.e., the pickoff misalignment angle $\theta_X$ must equal $-\alpha$. Similarly the misalignment angle $\beta$ for forcer $F_Y$ must be coincident with the y-pickoff axis $Y_P$, i.e., the pickoff misalignment $\theta_Y$ must equal $-\beta$. It has been determined that if the pickoff sensing axes are not in exact alignment to their respective forcing axes, large angular rate bias errors may occur. Such errors will not cancel with mode reversal. However, if the same electrodes are used for both the pickoff signals and the dither-drive forcing signals, then the pickoff sense axis will be exactly in line with the forcing axis. The coincidence of this alignment will increase the performance of the gyroscope and will result in any bias error that is generated being canceled when the modes are reversed. The vibrating mass gyroscope of FIG. 1 is known in general, however, the analysis associated with understanding the nature of bias error forms an aspect of the present invention.

The reason the sensing axis for the pickoff and the forcing axis will be in coincident alignment when the same electrodes are used for both functions will be briefly explained. The force developed between the electrode and the mass can be determined by the method of virtual work. The energy stored in a capacitor is equal to $CV^2/2$, where C is the capacitance between the electrode and the mass, and V is the voltage across the gap. Electrostatic force acting on the mass can be determined by differentiating this energy relative to the mass displacement. The derivative dC/dX used for determining the force is the same equation for the capacitance change that generates the pickoff signal. Therefore if the same electrodes are used for both forcing and pickoff, then the axis for forcing will be coincident with the axis for sensing displacement.

The described embodiments of the invention are especially, but not exclusively, adapted for axisymmetric vibrating gyros that can be considered to be two-dimensional oscillators. Both embodiments share the common feature that only one x-axis electrode and one y-axis electrode are used where each induces the drive signal to produce vibration along its respective axis and senses the change in voltage due to change of capacitance along its axis. Such a configuration is suited for other uses where common electrodes are used to both transmit input signals/effects and receive output signals/effects.

Figure 2:
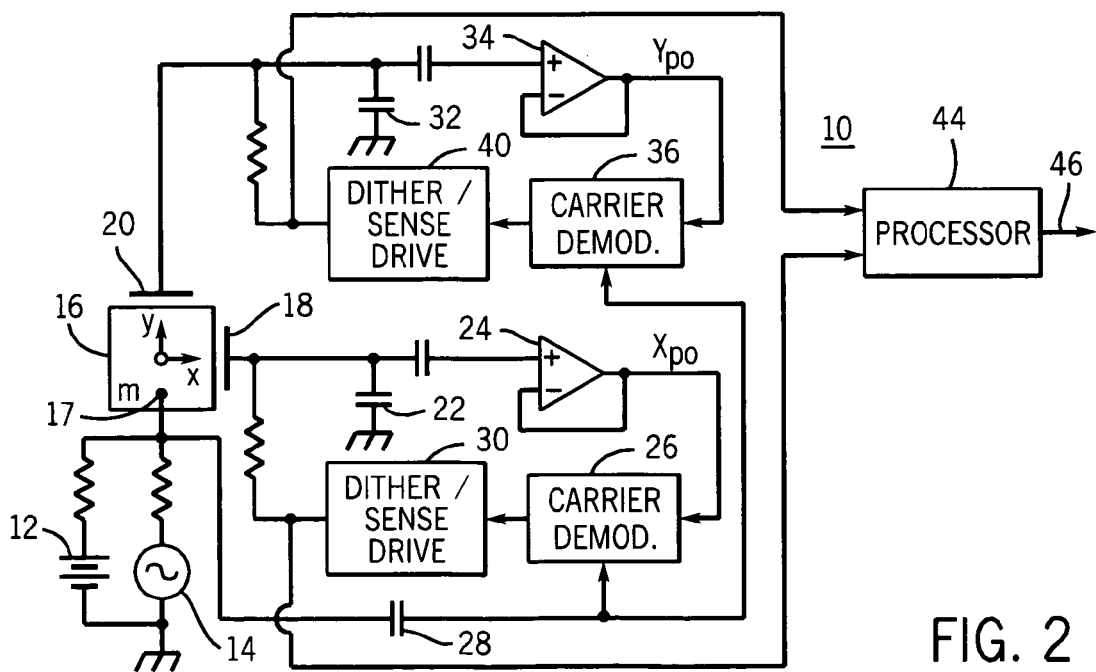
FIG. 2 is a schematic diagram of an exemplary embodiment of a vibrating mass gyroscope in accordance with the present invention.

In FIG. 2 an exemplary gyro (gyroscope) 10 is shown in simplified form to assist in understanding the aspects of the embodiment of the present invention. A DC bias voltage 12 and a source 14 of high frequency carrier voltage are applied directly to reference point 17 of the mass 16 which is shown to be rectangular but is not limited to a rectangular geometry. In this embodiment it is assumed that the current mode is one in which the mass 16 is driven by force induced by voltage on electrode 18 to vibrate along the x-axis. The motion of the mass 16 is represented by the voltage variation on the electrode 18 in the voltage divider formed by the electrode 18 and the fixed capacitance 22. This voltage is coupled to and buffered by amplifier 24. The carrier demodulator 26 demodulates the signal output $X_{po}$ (X pickoff voltage) from amplifier 24 based on the reference signal coupled by capacitor 28 from source 14. Based on the output of the carrier demodulator 26, the dither/sense driver 30, operating in the dither mode, generates a lower frequency feedback voltage output that is applied back on the electrode 18 to drive the mass 16 to a predetermined amplitude in the vibration mode.

In the current mode the sensing function is implemented by the circuitry associated with the y-axis electrode 20. This circuitry operates is a similar manner to that described for the circuitry associated with the x-axis electrode 18. The position of the mass 16 is represented by the voltage variation on the electrode 20 in the voltage divider formed by the electrode 20 and the fixed capacitance 32. This voltage is coupled to and buffered by amplifier 34. The carrier demodulator 36 demodulates the signal output $Y_{po}$ (Y pickoff voltage) from amplifier 34 based on the reference signal coupled by capacitor 28 from source 14. Based on the output of the carrier demodulator 36, the dither/sense driver 40, operating in the sense mode, generates a feedback voltage output that is applied back on the electrode 18 to null the pickoff signal in the sense mode. Thus, the voltage from the dither/sense driver 40 that is applied to plate 20 (that nulls the pickoff signal $Y_{po}$) represents the angular rate measurement during the current mode.

During the next mode of operation, the roles of the electrodes 18 and 20, as well as the associated circuitry, are reversed. Electrode 18 and associated circuitry will perform the sensing function and the electrode 20 and associated circuitry will control the vibration of the mass 16 along the y-axis. Thus, the sensed motion signal alternates with the mode of operation between $Y_{po}$ and $X_{po}$. It will be noted that the same electrodes are used for both receiving the motion detection signal as well as for coupling the vibration forcing signal. Hence, any common bias errors will be canceled when the measured angular rate signals of the two different modes are summed by a signal processor 44 to generate a resulting angular rate measurement 46 in which common bias errors have been canceled and hence are absent from the resulting angular rate measurement.

Figure 3:
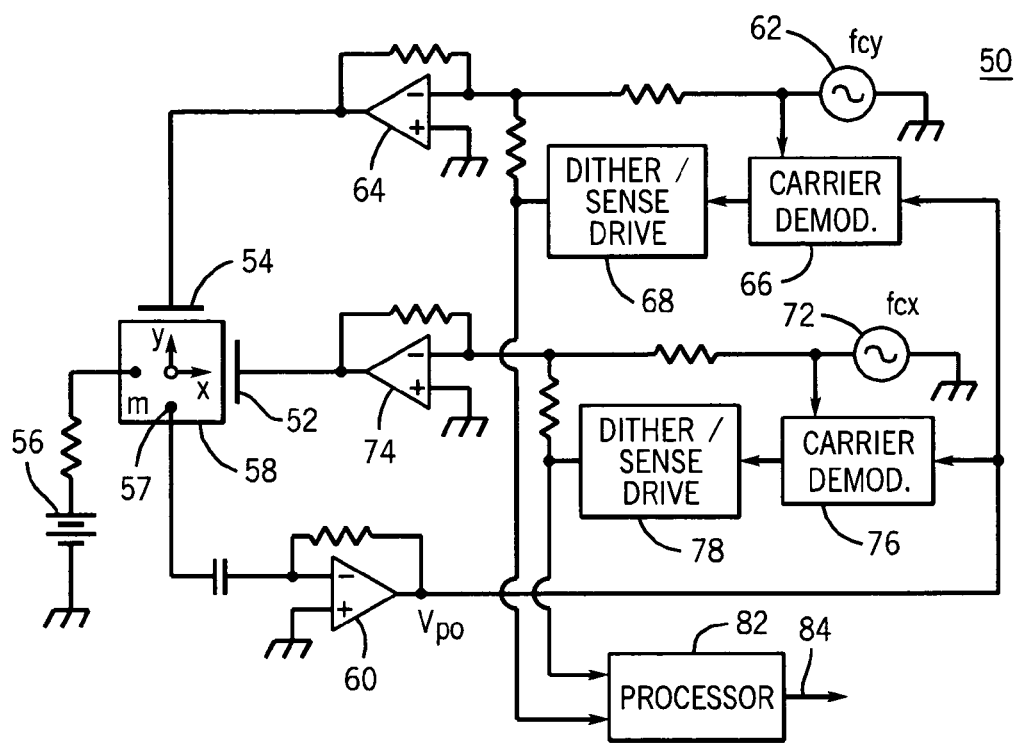
FIG. 3 is a schematic diagram of another exemplary embodiment of a vibrating mass gyroscope in accordance with present invention.

In FIG. 3 another exemplary embodiment 50 is shown in which carrier frequency voltages are applied to the electrodes 52 and 54, and the DC bias voltage from source 56 is applied to the reference point 57 of proof mass 58. The current into the virtual ground input of transimpedance amplifier 60 is proportional to the capacitance between each of the electrodes 52, 54 and the proof mass 58. The pickoff output voltage $V_P$ from amplifier 60 is a measure of the displacement of the mass 58 for both the x and y axis as will be explained below.

A high frequency signal source 62 operates at a first frequency and provides a signal as amplified by amplifier 64 to the y-axis electrode 54. A high frequency signal source 72 operates at a second frequency, different from the first frequency, and provides a signal as amplified by amplifier 74 to the y-axis electrode 52. The output signal from mass 58, which is the input to amplifier 60, is a combination of the two input signals on the electrodes 52 and 54. The output $V_{po}$ from amplifier 60 consists of these two signals. The portion of $V_{po}$ consisting of the first frequency is demodulated by the carrier demodulation 66 based on the first frequency reference signal from source 62. It will be assumed that in the current mode the mass 58 is vibrated along the x-axis. The output from carrier demodulator 66 is fed to the dither/sense driver 68 that operates in this mode as a sense driver whose output voltage is fed back via amplifier 64 to the electrode 54 to null the pickoff signal in the sense mode. Thus, the voltage from dither/sense drive 68 (that nulls the portion of $V_{po}$ consisting of the first frequency) represents the sensed angular rate measurement.

The portion of $V_{po}$ defined by the second frequency is demodulated by the carrier demodulator 76 based on the second frequency reference signal from source 72. The output from carrier demodulator 76 is fed to the dither/sense driver 78 that operates in this current mode as a dither driver to drive the mass to a given amplitude. The output voltage from dither/sense driver 78 is fed back via amplifier 74 to the electrode 52 to drive the mass 58 to the predetermined vibration condition. Thus, the voltage from dither/sense drive 78 represents the dither drive signal. A signal processor 82 sums the outputs from dither/sense drive 68 and 78, when being used in their sense mode, during the two modes to generate a resulting angular rate measurement 84 in which any common bias errors have been canceled and hence are absent from the resulting angular rate measurement.

In the embodiment 50 one operational amplifier 60 reads the voltage pickoff for both the X and Y axis. Therefore two separate carrier frequencies are used to differentiate between the two components of the signal $V_{po}$. As explained for embodiment 10, each electrode is used for both pickoff detection of the angular measurement and forcing function for the vibration of the mass.

Although exemplary implementations of the invention have been depicted and described in detail herein, it will be apparent to those skilled in the art that various modifications, additions, substitutions, and the like can be made without departing from the spirit of the invention. For example, the mass can be various geometric shapes. The sensed signals and dither driving functions can be implemented by digital signal processing techniques with conversion between analog and digital signals made by analog-to-digital and digital-to-analog converters. Once in the digital format, a microprocessor operating under stored program control can process the digital signals and can implement the demodulation and dither/sense driver functions.

The scope of the invention is defined in the following claims.

We claim:

1. A vibrating mass gyroscope comprising:

a mass disposed for movement;

first and second electrodes disposed adjacent the mass along an x-axis and y-axis, respectively;

a reference contact point on the mass;

circuitry, coupled to the first and second electrodes, adapted to provide during a first mode a dither driving voltage between the reference point and one of the first and second electrodes causing vibrating displacement of the mass along the one of the x-axis and y-axis associated with the one of the first and second electrodes while sensing a measurement voltage between the contact point and the other of the first and second electrodes where the measurement voltage represents a first angular value;

the circuitry adapted to provide during a second mode a dither driving voltage between the reference point and the other of the first and second electrodes causing vibrating displacement of the mass along the one of the x-axis and y-axis associated with the other of the first and second electrodes while sensing a measurement voltage between the reference point and the one of the first and second electrodes where the measurement voltage represents a second angular rate value;

a signal processor coupled to the circuitry and adapted to receive the first and second angular rate values, and to generate a resulting angular rate value based on both the first and second angular rate values.

2. The gyroscope of claim 1 wherein the first and second electrodes are alternately used during the first and second modes to induce the dither driving voltage and to sense the measurement voltage such that any common bias errors are substantially canceled from the resulting angular rate value.

3. The gyroscope of claim 1 further comprising:
a source of a high frequency carrier signal coupled to the contact point;
the circuitry adapted to induce the dither driving voltage based on the high frequency carrier signal on the one of the first and second electrodes during the first mode and the other of the first and second electrodes during the second mode.

4. The gyroscope of claim 1 further comprising:
a source of first and second high frequency carrier signals coupled to the first and second electrodes, respectively, where the frequency of the second carrier signal is different from the frequency of the first carrier signal;
the circuitry adapted to induce the dither driving voltage based on the first high frequency carrier signal between the reference point and the first electrode during the first mode and to induce the dither driving voltage based on the second high frequency carrier signal between the reference point and the second electrode during the second mode.

5. The gyroscope of claim 4 further comprising:
an amplifier having an input that reflects a virtual ground;
the input of the amplifier coupled to the contact point.

6. The gyroscope of claim 5 further comprising:
the amplifier having an output that contains two signal components corresponding to the first and second high frequency carrier signals that correspond respectively to the displacement of the mass in the direction of the first and second electrodes.

7. The gyroscope of claim 3 wherein the circuitry comprises:
first and second carrier demodulators coupled to the first and second electrodes, respectively, and adapted to demodulate dither drive information and sensing value information carried by the high frequency carrier signal;
first and second drivers coupled to receive outputs of the respective first and second carrier demodulators, the first and second drivers alternately generating the dither driving voltage and the measurement voltage during the first and second modes.

8. The gyroscope of claim 5 wherein the circuitry comprises:
first and second carrier demodulators coupled to an output of the amplifier and adapted to demodulate dither drive information and sensing value information carried respectively by the first and second high frequency carrier signals;
first and second drivers coupled to receive outputs of the respective first and second carrier demodulators, the first and second drivers alternately generating the dither driving voltage and the measurement voltage during the first and second modes.

9. A vibrating mass inertial instrument comprising:
a mass disposed for movement along an x-axis and y-axis, and having first and second surfaces adjacent the x-axis and y-axis, respectively;
first and second means, disposed adjacent the respective first and second surfaces of the mass, for each functioning as one plate of a capacitor formed respectively with the first and second surfaces of the mass;
circuit means, coupled to the first and second means, for inducing a dither driving voltage during a first mode on one of the first and second means causing vibrating displacement of the mass along one of the x-axis and y-axis, and the circuit means sensing a measurement voltage on the other of the first and second means during the first mode where the measurement voltage represents a first inertial value;
the circuit means inducing during a second mode a dither driving voltage on the other of the first and second means causing vibrating displacement of the mass along the other of the x-axis and y-axis and sensing during the second mode a measurement voltage on the one of the first and second means where the measurement voltage represents a second inertial value;
means for combining the first and second inertial values and generating a resulting inertial value based on both the first and second inertial values.

10. The instrument of claim 9 wherein the circuit means alternately uses the first and second modes between the first and second means to induce the dither driving voltage and to sense the measurement voltage such that any common bias errors are substantially canceled from the resulting inertial value.

11. A method for measuring an inertial attribute comprising the steps of:
vibrating a mass along one of an x-axis and y-axis, where the mass has first and second surfaces;
forming a first and second capacitor with first and second electrodes disposed adjacent the respective first and second surfaces of the mass;
inducing a dither driving voltage during a first mode on one of the first and second capacitors causing vibrating displacement of the mass along one of the x-axis and y-axis, and sensing a measurement voltage on the other of the first and second capacitors during the first mode where the measurement voltage represents a first inertial value;
inducing a dither driving voltage during a second mode on the other of the first and second capacitors causing vibrating displacement of the mass along the other of the x-axis and y-axis and sensing during the second mode a measurement voltage on the one of the first and second capacitors where the measurement voltage represents a second inertial value;
combining the first and second inertial values and generating a resulting inertial value based on both the first and second inertial values.

12. The method of claim 11 wherein the dither driving voltage and sensing of the measurement voltage alternate between the first and second capacitors during the first and second modes such that any common bias errors are substantially canceled from the resulting inertial value.

* * * * *